(12) United States Patent
Mishra et al.

(10) Patent No.: US 11,172,056 B2
(45) Date of Patent: *Nov. 9, 2021

(54) DYNAMICALLY CONFIGURABLE NETWORK GATEWAY

(71) Applicant: Goldman Sachs & Co. LLC, New York, NY (US)

(72) Inventors: Sambit Mishra, Jersey City, NJ (US); Adwait Gupte, Jersey City, NJ (US)

(73) Assignee: Goldman Sachs & Co. LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/886,067

(22) Filed: May 28, 2020

(65) Prior Publication Data

US 2021/0258410 A1 Aug. 19, 2021

Related U.S. Application Data

(63) Continuation of application No. 16/794,122, filed on Feb. 18, 2020, now Pat. No. 10,708,394.

(51) Int. Cl.
*H04L 29/08* (2006.01)
*H04L 12/54* (2013.01)
*H04L 12/66* (2006.01)
*G06F 21/64* (2013.01)
(Continued)

(52) U.S. Cl.
CPC ............ *H04L 69/326* (2013.01); *G06F 21/64* (2013.01); *H04L 12/54* (2013.01); *H04L 12/66* (2013.01); *H04L 49/251* (2013.01); *H04L 67/143* (2013.01); *H04L 67/2809* (2013.01); *H04L 69/166* (2013.01)

(58) Field of Classification Search
CPC ........ H04L 12/66; H04L 12/56; H04L 69/326
See application file for complete search history.

(56) References Cited

U.S. PATENT DOCUMENTS

| 5,491,687 A | 2/1996 | Christensen et al. |
|---|---|---|
| 2014/0289094 A1 | 9/2014 | Gaber et al. |
| 2018/0076978 A1* | 3/2018 | Schubert ............ H04L 12/2832 |

(Continued)

OTHER PUBLICATIONS

PCT International Search Report and Written Opinion, PCT Application No. PCT/IB2021/051208, dated Apr. 29, 2021, 18 pages.

*Primary Examiner* — Adnan M Mirza
(74) *Attorney, Agent, or Firm* — Fenwick & West LLP

(57) ABSTRACT

A broker system dynamically adjusts data processing techniques used by a network gateway for forwarding data over a network from a client system to an exchange system based on a switch mode parameter. The broker system dynamically adjusts the network gateway from using an error-propagating data processing technique (e.g. cut-through switching) to a non-error-propagating data processing technique (e.g. store and forward switching) based on the switch mode parameter. In particular, the broker system may adjust the network gateway when a count of unsuccessfully validated protocol data units meets a threshold specified by the switch mode parameter. While using the error-propagating technique, the broker system may modify a portion of the data protocol unit corresponding to a transport layer of a network protocol used by the network when a protocol data unit is unsuccessfully validated.

20 Claims, 4 Drawing Sheets

(51) Int. Cl.
*H04L 29/06* (2006.01)
*H04L 12/947* (2013.01)

(56) References Cited

U.S. PATENT DOCUMENTS

2018/0113836 A1* 4/2018 Hirata .................... H04L 69/40
2019/0379768 A1 12/2019 Amicangioli et al.

* cited by examiner

200

DYNAMICALLY CONFIGURABLE NETWORK GATEWAY

CROSS REFERENCE TO RELATED APPLICATIONS

This application is a continuation of U.S. patent application Ser. No. 16/794,122, filed Feb. 18, 2020, which is incorporated by reference.

FIELD OF DISCLOSURE

This disclosure generally relates to computer networking, and in particular to dynamically adjusting a network gateway system based on a configurable switch mode parameter.

BACKGROUND

Network gateways rely on various techniques to receive, validate, and forward data (e.g. network data frames) from a sending system to a receiving system over a network. Exemplary techniques include store and forward switching and cut-through switching. A network gateway can avoid forwarding data containing errors by fully validating the data before it is forwarded (e.g. using store and forward switching). However, this introduces latency into the network. Conversely, if a network gateway begins forwarding data before validation is complete, the network latency may be reduced at the cost of introducing secondary measures to handle invalid data (e.g. using cut-through switching). Such techniques are preferable in network environments for which it is highly desirable to achieve the lowest possible network latency, such as buying and selling securities on stock exchanges. However, in some of these environments, there may be technical, regulatory, contractual, or policy limitations on the nature and scope of the allowed secondary measures.

SUMMARY

A method, system, and computer-readable storage medium are disclosed for dynamically adjusting data processing techniques used by a network gateway for forwarding data over a network from a client system to a server system based on a switch mode parameter. The configuration of a network gateway is dynamically adjusted from using an error-propagating data processing technique (e.g. cut-through switching) to a non-error-propagating data processing technique (e.g. store and forward switching) based on the switch mode parameter. In particular, the configuration of the network gateway may be adjusted when a count of unsuccessfully validated protocol data units meets a threshold specified by the switch mode parameter. The switch mode parameter may be dynamically configured based on requirements of the client system or the server system.

In one embodiment, the network gateway is part of a broker system and the server is an online securities exchange (e.g. a stock exchange). The network gateway of the broker system may be configured to process data based on the requirements of the exchange system. For example, some exchange systems may enforce policies in relation to received orders which have been invalidated using traditional error-propagating switching methods, such as modifying a transmitted protocol data unit representing the order (e.g. a frame in TCP/IP) such that the entire protocol data unit will be determined invalid at the exchange system. The policies may include tracking a number of invalid protocol data units received at an exchange system (or at one or more switches on the way to the exchange system) and triggering preventative measures at the exchange system when the number reaches a threshold. For example, an exchange system may notify an administrator of the exchange system responsible for investigating network issues. To avoid increasing the invalid count at the exchange system, when an order is invalid the broker system modifies portions of the protocol data unit representing the order corresponding to a transport layer of the network (e.g. the transport layer in TCP/IP) rather than invalidating the transmitted protocol data unit itself (e.g. the data frame corresponding to the link layer in TCP/IP). As such, the broker system may still employ a lower latency, error-propagating data processing technique when forwarding data to exchange systems which enforce such policies.

Embodiments of the disclosed method, system, and storage-medium include configuring a network gateway of a broker system to forward data representing a financial transaction using an error-propagating data processing technique (i.e. where some data is forwarded prior to being validated). The broker system receives a data protocol unit representing an order (e.g. a financial transaction) from a client sending system intended for processing by a receiving exchange system that includes transport data (i.e. data corresponding to a transport layer of the network). Using the first data processing technique, the broker system validates the received data protocol unit (e.g. determines whether the client system has sufficient funds, or the transaction does not violate any exchange restrictions). In response to determining the data protocol unit is invalid, the broker system modifies the transport data such that the exchange system will not attempt to process the financial transaction (e.g. a TCP checksum will invalidate the data at the transport layer), and additionally increments an unsuccessful validation count. After forwarding the modified transport data to the exchange system using the first data processing technique, the broker system compares the unsuccessful validation count to a switch mode parameter including an unsuccessful validation threshold. In response to determining that the unsuccessful validation count exceeds the unsuccessful validation threshold, the broker system configures the network gateway to use a second, non-error-propagating data processing technique.

Although the embodiments disclosed herein are discussed in relation to the exemplary case of a broker system which forwards data (e.g. orders) from a client system to an exchange system, one skilled in the art will recognize that the same embodiments apply to any networking switching system which forwards data from a sending system to a receiving system over a network.

DETAILED DESCRIPTION

Reference will now be made to several embodiments, examples of which are illustrated in the accompanying figures. It is noted that wherever practicable similar or like reference numbers are used in the figures to indicate similar or like functionality. The example embodiments are described in the context of a broker system sending transaction requests to an online securities exchange (e.g. a stock exchange). However, one skilled in the art will recognize that the disclosed techniques may be used in various contexts where data is sent from one system to another where it is desirable to balance latency with the number of instances of data being invalidated after a portion of it has already been forwarded. Furthermore, alternative embodiments of the structures and methods may be employed without departing from the principles described.

Broker System Environment

Figure 1:
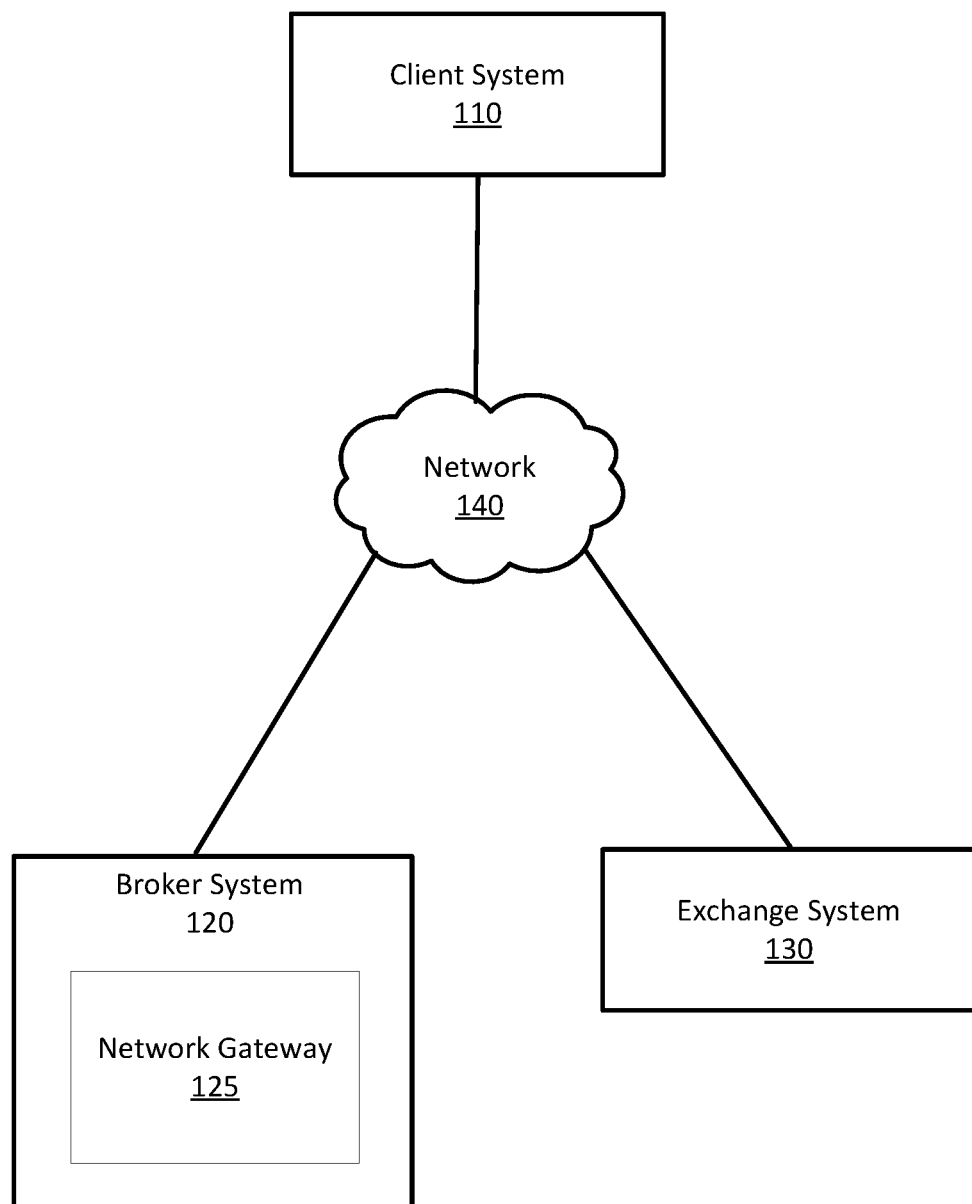
FIG. 1 illustrates a networked computing environment with a broker system including a configurable network gateway, according to an embodiment.

FIG. 1 illustrates one embodiment of networked computing environment 100 that is suitable for submitting and processing a financial transaction request. In the embodiment shown, environment 100 includes client system 110, broker system 120, and exchange system 130, communicating over network 140. While not depicted, additional client systems or exchange systems may be included in environment 100 and may be used by service providers, such as third-party entities.

Client system 110 is a computing system capable of transmitting data over network 140 to broker system 120. Client system 110 may consist of one or more computing devices configured to communicate with broker system 120 via network 140. Example computing devices include a server computer, a laptop computer, a desktop computer, a mobile device (e.g. a phone or tablet). In an embodiment, client system 110 is configured to execute software operable to transmit orders to broker system 120. For example, client device 110 may execute software associated with broker system 120, such as an application facilitating the financial transactions involving the buying and selling of securities (i.e. orders) listed on exchange system 130 using broker system 120. In this case, client device 110 may be associated with an investor, trader, or other third-party client of broker system 120. Orders are discussed in greater detail below with reference to exchange system 130.

Broker system 120 is a computing system capable of transmitting data between client system 110 and exchange system 130 via network 140. Broker system 120 includes network gateway 125 which is able to use multiple data processing techniques to receive and transmit data between client system 110 and exchange system 130. Broker system 120 may additionally include one or more computing devices configured to transmit from client system 110 to exchange system 130 via network 140. The term data processing technique, as used herein, refers to a computer process for receiving data from a sending system (e.g. client system 110) intended for forwarding to a receiving system (e.g. exchange system 130) and processing the data to determine if and how the data should be provided to the receiving system. Data processing techniques include network switching techniques such as cut-through switching and store and forward switching, and additionally include any processing of received data such as permanent storage or deletion of data, or termination of network communication. In particular, data processing techniques may be error-propagating or non-error-propagating. Error-propagating data processing techniques do not validate all received data prior to forwarding the data, and as a result may forward (i.e. propagate) invalid data to a receiving system. An example error-propagating data processing technique is cut-through switching. Conversely, non-error-propagating data processing techniques do not forward invalid data to a receiving system. An example non-error-propagating technique is store and forward switching. When using an error-propagating technique, broker system 120 may forward data describing a financial transaction which violates one or more rules of the broker system 120 or the exchange system 130 (e.g. sender has insufficient funds or is subject to sanctions, etc.). Conversely, while using a non-error-propagating technique broker system 120 may only forward data describing financials transactions which do not violate any rules of the broker system 120 or the exchange system 130.

When using store and forward switching, broker system 120 stores data as it is received from client system 110 and is forwarded altogether (e.g. the entire frame) to exchange system 130 only if the data is successfully validated (e.g. the data passes the DMA risk checks and the data integrity is verified). Conversely, when using cut-through switching, broker system 120 forwards data as it is received and secondary measures are taken if the data is not successfully validated, such as modifying a portion of the data remaining to be forwarded such that it will not pass validation at the receiving system. While cut-through switching provides for reduced network latency, store and forward switching ensures any data received at the receiving system does not contain any errors.

Broker system 120 may facilitate the buying and selling of securities (e.g. stocks, futures, options, etc.) on one or more exchange systems 130, or any additional client transactions provided by exchange system 130 (i.e. orders). Broker system 120 may provide software to client system 110 allowing client system to select and submit orders directed at exchange system 130, such as via a software application installed on a device included with client system 110, an application programming interface (API), or any other process for facilitating network communication between client device 110 and broker system 120.

Broker system 120 may validate orders while using either error-propagating or non-error-propagating data processing techniques based on various rules defined by client system 110, broker system 120, or exchange system 130. For example, broker system 120 may validate orders using standard Direct Market Access (DMA) risk checks. DMA risk checks may be specific to client system 110, such as a quantity limit on a market order submitted by client system 110, or a limit on the price differential between a market order for a given security and a current market price for the same security. Additionally, DMA risk checks may be specific to broker system 120, such as an order frequency rate limit for any given client system 110 or governmental sanctions applied to securities relevant to a given order.

Network gateway 125 receives and forwards data sent to broker system 120 from one third party system (e.g. client system 110) to another third-party system (e.g. exchange system 130) over network 140 using one or more data processing techniques. Network gateway 125 may be implemented as one or more hardware components of broker system 120, such as an ethernet switch or router. Network gateway 125 may be operable to receive, modify, and transmit data corresponding to any network protocol used by network 140. For example, if network 140 uses the TCP/IP network protocols, network gateway 125 may receive data in a format corresponding to the link layer protocol, process and modify portions of the received data corresponding to any of the link, internet, transport, and application layer protocols, and finally forward the data in a format corresponding to the link layer protocol. Network gateway 125 may be coupled to broker system 120 via a wired or wireless connection, and broker system 120 may communicate with network gateway 125 to adjust or modify data processing techniques used by network gateway 125. Additionally, broker system 120 may include multiple network gateways 125.

Exchange system 130 is a computing system capable of receiving data representing orders from broker system 120 sent by via network 140 and executing the instructions indicated by the order. The term order, as used herein, refers to data encoding instructions for executing any transaction offered by exchange system 130. Example orders include market orders, limit orders, and stop orders. Exchange system 130 may be a computing system corresponding to any securities exchange, such as the New York Stock Exchange (NYSE), the NASDAQ, the Tokyo Stock Exchange (TSE), etc. Exchange system 130 may enforce various policies in relation to the integrity of data received from broker system 120, or any other third-party system, in order to mitigate security risks. For example, exchange system 130 may include policies specifying criteria in relation to invalid data corresponding to one or more network communication protocols, such as placing a threshold on the number of received orders originating from client system 110 which are invalided based on an FCS. In response to the number of received orders determined invalid based on the FCS exceed the threshold, the exchange system 130 may initiate preventative measures. For example, the exchange system 130 may notify an administrator of the exchange system 130 that broker system 120 is sending invalid orders. Exchange system 130 may make the criteria corresponding to any policies available to third-party systems (e.g. client system 110 or broker system 120) and may communicate these policies to third-party systems over network 140.

Network 140 comprises any combination of local area and/or wide area networks, using both wired and/or wireless communication systems. Network 140 may employ various communications technologies and/or protocols. For example, network 140 may utilize communication technologies such as Ethernet, 802.11, 3G, 4G, digital subscriber line (DSL), etc. The network 140 may also employ network 140 protocols for communicating information via the network 140. Some example protocols may include the internet protocol suite (TCP/IP), Ethernet/Industrial protocol (EtherNet/IP), hypertext transport protocol (HTTP), simple mail transfer protocol (SMTP), file transfer protocol (FTP), etc. Data exchanged over the network 140 may be represented using any suitable format, such as hypertext markup language (HTML) or extensible markup language (XML). In some embodiments, all or some of the communication links of the network 130 may be encrypted using any suitable technique or techniques.

In some embodiments, network 140 employs network protocols that are represented by a series of layers, such as the four-layer TCP/IP network protocol or another protocol generally conforming to the seven-layer Open Systems Interconnection (OSI) model. The term protocol data unit, as used herein, refers to a representation of data corresponding to a particular layer of a network protocol employed by network 140. As an exemplary case used throughout the specification, network 140 may use the TCP/IP network protocol for transmitting data between client system 110, broker system 120, and exchange system 130. The four layers of the TCP/IP protocol each have a corresponding data representation (i.e. protocol data unit), which consist of at least a header and a data payload, where the data payload of the protocol data unit corresponding to a given layer is the protocol data unit corresponding to a layer directly above the given layer. Within the context of this example, a frame refers to a protocol data unit corresponding to the TCP/IP link layer, a datagram refers to a protocol data unit corresponding to the TCP/IP network layer, and a segment is used to refer to a protocol data unit corresponding to the TCP/IP transport layer.

In the same or different embodiments as described above, network 140 employs a network protocol that includes a transport layer (e.g. the transport layer of the OSI model or the transport layer of the TCP/IP protocol). Although specific implementations and functions of a transport layer vary between network protocols, as used herein a transport layer is responsible for facilitating host to host communication, and specifically for delivering data received at a computer system to a destination process on the computer system (e.g. an instance of an application on the computer system). Furthermore, the transport layer is distinct from lower layers responsible for network node to node communication (e.g. the TCP/IP network layer) or the transfer of data between two directly connected nodes (e.g. the TCP/IP link layer).

Configurable Network Gateway

Figure 2:
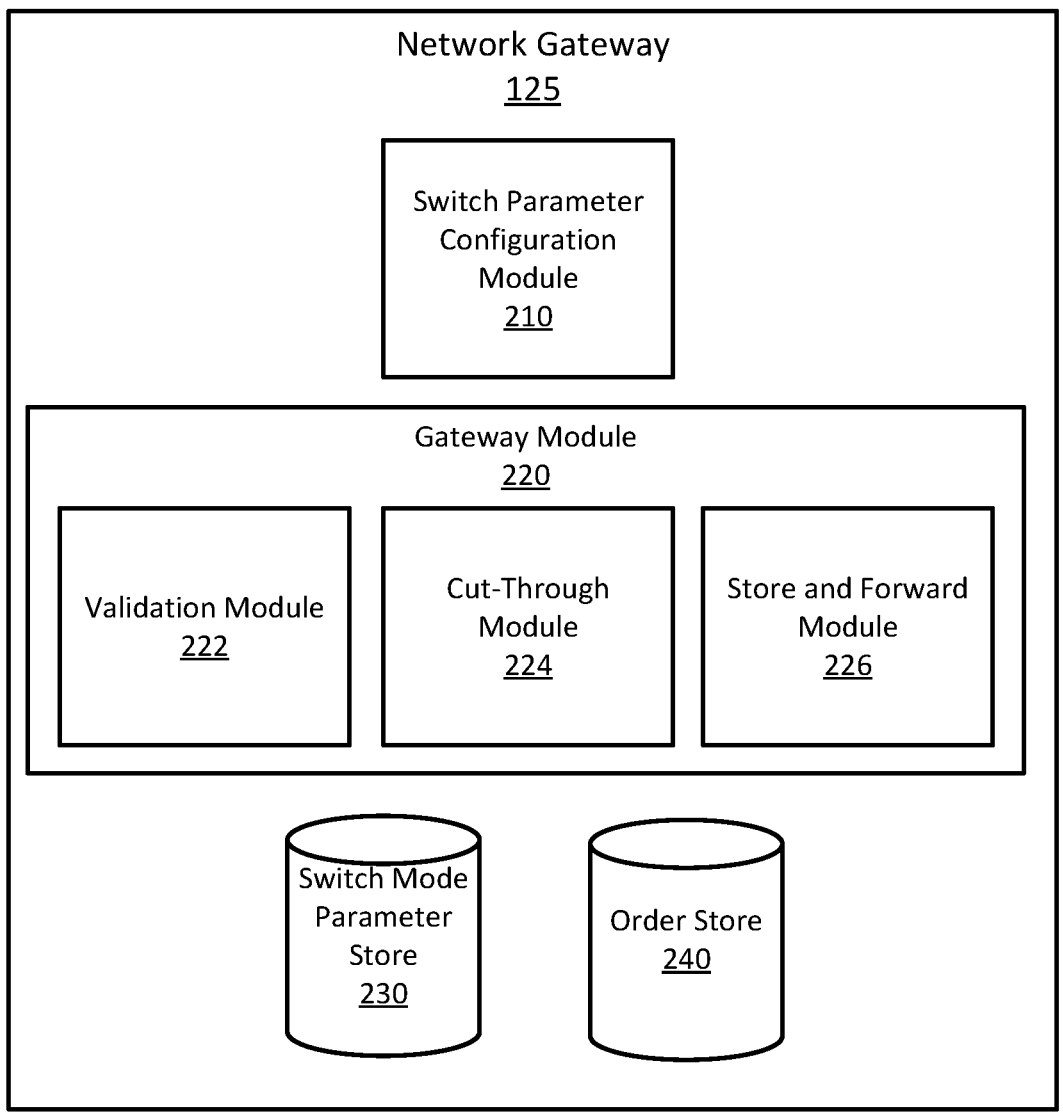
FIG. 2 is a block diagram representing the configurable network gateway of FIG. 1, according to an embodiment.

FIG. 2 illustrates a block diagram 200 representing configurable network gateway 125, according to an embodiment. Network gateway 125 includes switch parameter configuration module 210, gateway module 220, switch mode parameter store 230, and order store 240. In various other embodiments, broker system 120 includes additional or fewer components. Additionally, the components of network gateway 125 may perform additional or different functions, or be organized in a different manner, as depicted in FIG. 2 and described below.

Switch parameter configuration module 210 configures and maintains one or more switch mode parameters corresponding to the error risk of data received from client system 110. A switch mode parameter may describe a threshold error tolerance of broker system 120 in relation to invalid data received from client system 110, and furthermore may indicate when the data processing mode of switching module 220 should be adjusted. In particular, the switch mode parameter may include one or more values indicating a threshold number of unsuccessfully validated orders the network gateway 125 will forward using one data processing technique before adjusting to a different data processing technique (i.e. a different data processing mode). Additionally, the switch mode parameter may include one or more additional values establishing criteria in relation to error tolerance of broker system 120. For example, the switch mode parameter may include an unsuccessful validation rate threshold (e.g., X unsuccessfully validated orders within Y milliseconds). The switch mode parameter may be stored by switch parameter configuration module 210 in switch mode parameter store 230.

In some embodiments, switch parameter configuration module 210 provides a user interface for setting and modifying the switch mode parameter. In this case, an administrator of broker system 120 may interact with the interface to set the switch mode parameter. The interface may be displayed by a component of broker system 120 (e.g. a general computing device) which is communicatively linked to network gateway 125. In response to a user interaction with the interface, switch parameter configuration module 210 may update the switch mode parameter stored in switch mode parameter store 230. For example, a system administrator may set the unsuccessful validation threshold of the switch mode parameter to zero, such that broker system 120 will not forward orders received from client system 110 containing any errors. As another example, a system administrator may set the unsuccessful validation threshold of the switch mode parameter to any positive integer value. Thus, the broker system 120 may send some invalid orders, but the number may be maintained under a threshold to be compliant with the policy requirements of the exchange system 130. In one embodiment, broker system 120 requires that the unsuccessful validation threshold of the switch mode parameter is set to a value within a particular range of positive integer values (e.g. zero to ten).

In some embodiments, switch parameter configuration module 210 generates or modifies the switch mode parameter in response to communication received from exchange system 130, or otherwise based on requirements of exchange system 130. Exchange system 130 may provide data validation criteria associated with an enforced data validation policy to broker system 120, and switch parameter configuration module 210 may modify the switch mode parameter based on the criteria. In particular, exchange system 130 may provide criteria specifying a limit on how many invalid data protocol units corresponding to one or more layers of network 140 the exchange system 130 will permit. For example, if network 140 uses TCP/IP, exchange system 130 may indicate that only 5 orders from client system 110 will be unsuccessfully validated based on data included in the order corresponding to a transport layer of the network before the exchange system will reject all subsequent orders. Accordingly, switch parameter configuration module 210 may set the switch mode parameter error threshold to 4.

In some embodiments, broker system 120 receives orders from a plurality of client systems 110 and switch parameter configuration module 210 generates and modifies a unique switch mode parameter for each client system 110 which sends orders through network gateway 220. In further embodiments, switch parameter configuration module 210 generates and modifies a set of switch mode parameters for each client system 110, where each switch mode parameter in the set corresponds to a different exchange system 130. In still further embodiments, switch parameter configuration module 210 generates and maintains a single switch mode parameter corresponding to orders received from each client system 110. The one or more switch mode parameters may be stored by switch parameter configuration module 210 in switch mode parameter store 230.

Gateway module 220 receives data (e.g. orders) from client system 110 and forwards the data to exchange system 130 using one or more data processing techniques. In particular, gateway module 220 includes validation module 222, cut-through module 224, and store and forward module 226. Gateway module 220 may be configured to use a particular data processing technique for data received from client system 110 depending on a switch mode parameter stored in switch mode parameter store 230. In one embodiment, gateway module 220 is configured to forward data using cut-through switching during one mode of operation and store and forward switching during another mode of operation. For example, gateway module 220 may automatically change from using cut-through switching to store and forward switching when the number of unsuccessfully validated orders received from client system 110 reaches or exceeds a threshold indicated by the switch mode parameter. As another example, gateway module 220 may terminate the network connection with client system 110 or discard any received order from client system 110 if the count of unsuccessfully validated order meets the threshold indicated by the switch mode parameter. In the same or different embodiments, broker system 120 receives orders from a plurality of client systems 110. In this case, gateway module 220 may switch data processing technique when the number of unsuccessfully validated orders received across each of the plurality of client system 110 reaches or exceeds the threshold, as indicated by a single universal switch mode parameter. Alternatively, the gateway module 220 may track the number of unsuccessfully validated order for each client system 110 individually (e.g. using a unique switch mode parameter for each client system 110, as described above).

In some embodiments, gateway module 220 periodically adjusts a count describing the number of unsuccessfully validated orders received from client system 110. For example, a switch mode parameter corresponding to client system 110 may include an unsuccessful validation rate threshold, as described above in relation to switch parameter configuration module 210. In this case, gateway module 220 may reset the unsuccessful validation count at time intervals based on the rate indicated by the switch mode parameter (e.g. every 10 milliseconds).

In some embodiments, gateway module 220 is configured to use a particular data processing technique in response to communication received from exchange system 130, or otherwise based on requirements of exchange system 130. As described above in relation to switch parameter configuration module 210, exchange system 130 may provide criteria specifying a limit on how many invalid data protocol units corresponding to one or more layers of network 140 the exchange system 130 will permit.

Validation module 222 may validate data representing orders received by network gateway 125 from a third-party system (e.g. client system 110 or exchange system 130). Validation module 222 may validate data according to rules specified by broker system 120 or exchange system 130, such as using on DMA risk checks, as discussed above in reference to broker system 120. For example, validation module 222 may verify that an order does not violate any rules of broker system 120 or exchange system 130 (e.g. invalid number of securities requested for a buy or sell, insufficient client funds, sanctions imposed on relevant securities, etc.). Furthermore, validation module 222 may use validation techniques corresponding to cut-through module 224 or store and forward module 226, depending on the data processing technique gateway module 220 is currently configured to use. This is discussed in greater detail below with reference to cut-through module 224 and store and forward module 226.

Validation module 222 may additionally validate the integrity of data representing orders received by network gateway 125. Validation module 222 may validate received data according to protocols of the network 140 (e.g. TCP/IP). For example, validation module 222 may use one or more error detecting codes corresponding to one or more protocol data units contained in the received data (e.g. FCS, TCP checksums, etc.). Validation module 222 may validate the one or more error detecting codes using data validation algorithms corresponding to a given error detecting code and communication protocol, such as using cyclical redundancy check for FCS at the link layer of TCP/IP. As another example, validation module 222 may use a checksum algorithm (e.g. a cryptographic hash function) to validate the transport layer of TCP/IP, or any additional layer which includes a checksum.

Cut-through module 224 forwards data received by gateway module 220 from client system 110 to exchange system 130 using cut-through switching. In particular, cut-through module 224 begins forwarding data received by gateway module 220 before the data has been validated by validation module 222. Cut-through module 224 may begin forwarding received data to exchange system 130 as soon as the destination address (e.g. the media access control (MAC) address for exchange system 130) is identified. In other cases, cut-through module 224 may begin forwarding received data when certain additional criteria have been satisfied, such as a threshold number of bytes of data have been received. Cut-through module 224 may validate the received data using validation module 222 as soon as requisite data for validation is received. For example, validation module 222 may validate an order in relation to DMA risk checks once data describing the financial transaction in the order are received (e.g. the relevant securities, the order size, the order price, etc.). As another example, validation module 222 may validate the integrity of the data representing an order upon receiving an error detecting code. If the data is determined to be invalid by validation module 222, cut-through module 224 may modify the received data in order to indicate to the exchange system 130 (which may have already received some of the invalid data) that the data is invalid. For example, cut-through module 222 may modify the data such that an error detecting code included in the data, such as a checksum, will invalidate the data at the exchange system 130. If the data is successfully validated by validation module 222, cut-through module 224 may finish forwarding the received data to exchange system 130.

In some embodiments, cut-through module 224 receives a protocol data unit corresponding to the TCP/IP link layer (i.e. a frame). In this case, cut-through module 224 may begin forwarding the frame to exchange system 130 as soon as the exchange system 130 media access control address (MAC) is identified. As the frame is received, cut-through module 224 may use validation module 222 to incrementally validate the data in the frame as it is received, such as performing DMA risk checks on the order itself. If validation module 222 successfully validates the frame, cut-through module 224 forwards the remainder of the frame without modifying the data included in the frame. However, if validation module 222 does not successfully validate the frame, cut-through module 224 may modify a portion of the TCP payload which has not yet been transmitted to exchange system 130 such that the TCP checksum included in the TCP segment portion of the frame payload will invalidate the TCP segment at the transport layer of the exchange system 130. For example, cut-through module may modify one or more bytes in the order payload itself (i.e. the data describing the financial transaction) within the TCP segment which has not yet been forwarded to the exchange system. Furthermore, cut-through module 224 may ensure that the frame's FCS will not result in the frame being invalidated at the exchange system 130 despite the TCP segment having been modified. In particular, cut-through module 224 may recalculate the FCS as the frame data is forwarded such that the recalculated FCS will account for any modifications in the TCP segment and result in successful validation of the frame at the link layer of the exchange system 130. In the same or different embodiments, cut-through module 224 uses validation module 222 to validate the received frame based on error detection codes corresponding to other TCP/IP layers, and/or additional validation rules corresponding to cut-through module 224, gateway module 220, or broker system 120. Cut-through module 224 or validation module 222 may process the received frame in order to individually validate or modify a datagram at a network layer, a segment at a link layer, or one or more additional protocol data units corresponding to an application layer.

Store and forward module 226 forwards data representing orders received by gateway module 220 from client system 110 to exchange system 130 using store and forward switching. In particular, store and forward module 226 stores data as it is received in order store 226. Once all of the data representing an order has been received and stored in order store 240, store and forward module 226 may validate the data using validation module 222. If the data is not successfully validated by validation module 222, store and forward module 224 may discard the data representing the order and may additionally terminate the network connection with client system 110. If the data is successfully validated by validation module 222, store and forward module 224 may forward all of the data representing the order to exchange system 130.

Figure 3:
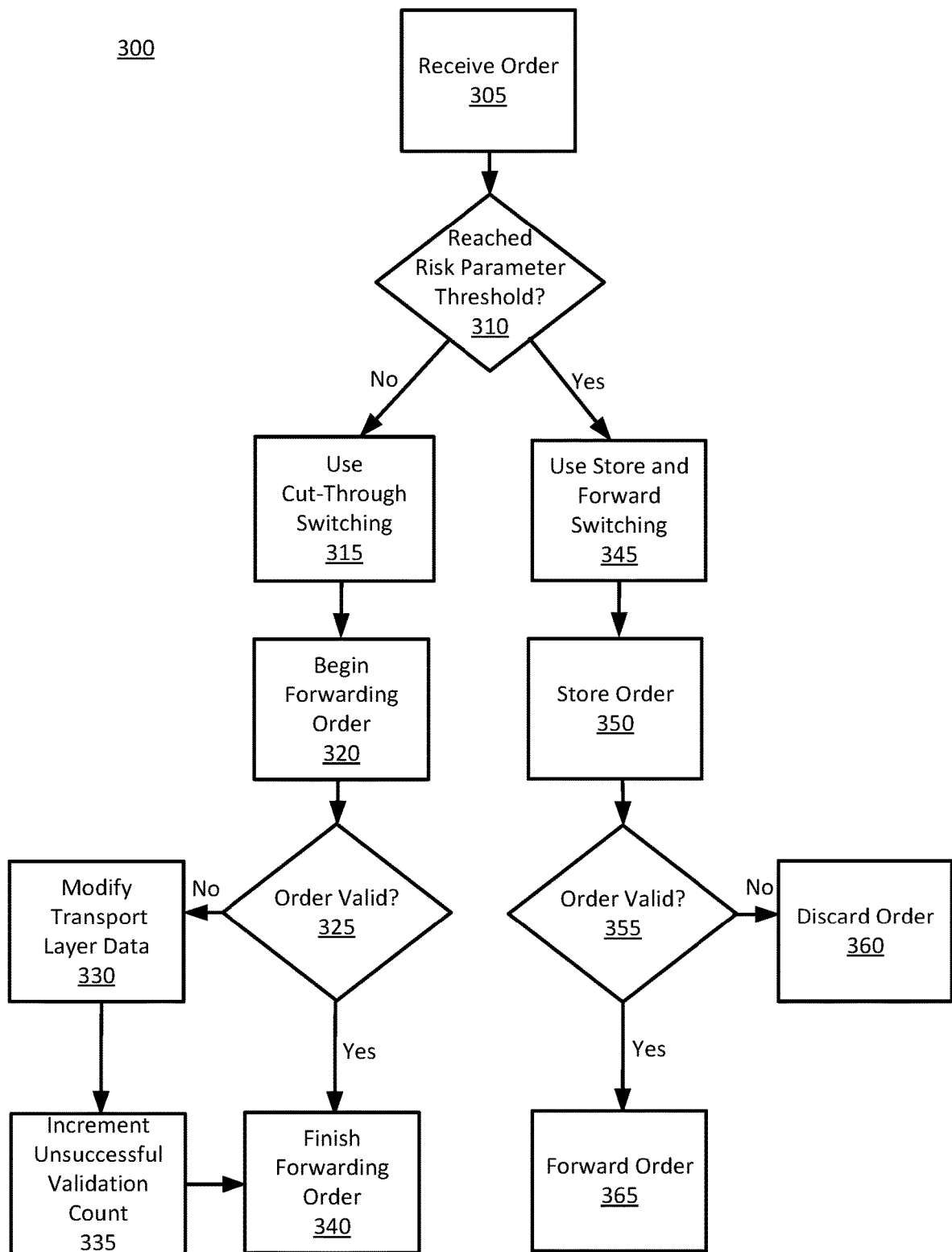
FIG. 3 illustrates a process flow for dynamically configuring a network gateway to use multiple data processing techniques based on a switch mode parameter, according to an embodiment.

FIG. 3 illustrates a process flow 300 for dynamically configuring network gateway 125 to use multiple data processing techniques based on a switch mode parameter, according to an embodiment. Process 300 begins with network gateway 125 receiving 305 an order from client system 110 intended for forwarding to exchange system 130. For example, client system 110 may submit a market order to buy some number of stocks listed on exchange system 130, and network gateway 125 may receive the order as a protocol data unit corresponding to the network protocol of network 140 at gateway module 220.

If network gateway 125 determines 310 that the switch mode parameter error threshold has not been reached, then network gateway 125 proceeds to use 315 cut-through switching to forward the received order. For example, gateway module may compare a switch mode parameter corresponding to client system 110 stored in switch mode parameter store 230 to an unsuccessful validation count also corresponding to client system 110 and stored in switch mode parameter store 230. Using cut-through switching, network gateway 125 begins 320 forwarding the received order to exchange system 130. While receiving the order, network gateway 125 validates 325 the order. For example, validation module 222 may use one or more DMA risk checks to ensure the order (i.e. the application data) does not violate any rules. If the order is successfully validated, network gateway 125 finishes 340 forwarding the order to exchange system 130. If the order is not successfully validated, network gateway 125 modifies 330 data included in the order corresponding to a transport layer for the network protocol of network 140. For example, cut-through module 224 may modify one or more values in a TCP header (e.g. a sequence number) of a TCP segment representing the order such that a TCP checksum in the TCP header will invalidate the TCP segment at the exchange system 130. In addition to modifying the transport data, network gateway 125 increments 335 an unsuccessful validation count representing the number of orders received from client system 110 which were not successfully validated. Finally, network gateway 125 finished 340 forwarding the remainder of the received order, including the modified transport data.

If network gateway 125 determines 310 that the switch mode parameter error threshold has been reached, then network gateway 125 proceeds to use 345 store and forward switching to forward the received order. Using store and forward switching, network gateway 125 stores 350 the data representing the order as it is received. For example, store and forward module 226 may store the order in order store 240. After having received and stored the entire order, network gateway 125 validates 355 the order (e.g. using DMA risk checks, as described above). If the order is not successfully validated, network gateway discards 360 the order. If the order is successfully validated, network gateway 125 forwards 365 the order to exchange system 130.

In some embodiments, if network gateway 125 determines that the switch mode parameter error threshold has not been reached, then network gateway 125 proceeds to terminate a communication session between broker system 120 and the client system 110. For example, network gateway 125 may terminate the TCP session facilitating communication between the client system 110 and broker system 120. In this case, orders will no longer be received from client device 110 and processed by broker system 120. Furthermore, network gateway 125 may cancel any previously forwarded orders currently pending on exchange system 130 (e.g. a market order which has not been executed).

In some embodiments, exchange system 130 transmits a response to network gateway 125 upon processing an order received from network gateway 125 which confirms receipt of the order and the results of any processing of the order. For example, if network 140 uses the TCP/IP protocol, then exchange system 130 responds to client system 110 through network gateway 125 with an acknowledgment message. In particular, the acknowledgement may be included in the TCP segment header. If network gateway 125 has modified the TCP segment as described above, then the acknowledgment in the response of exchange system 130 may indicate that the TCP segment was not successfully validated based on the TCP checksum.

Computer System

Figure 4:
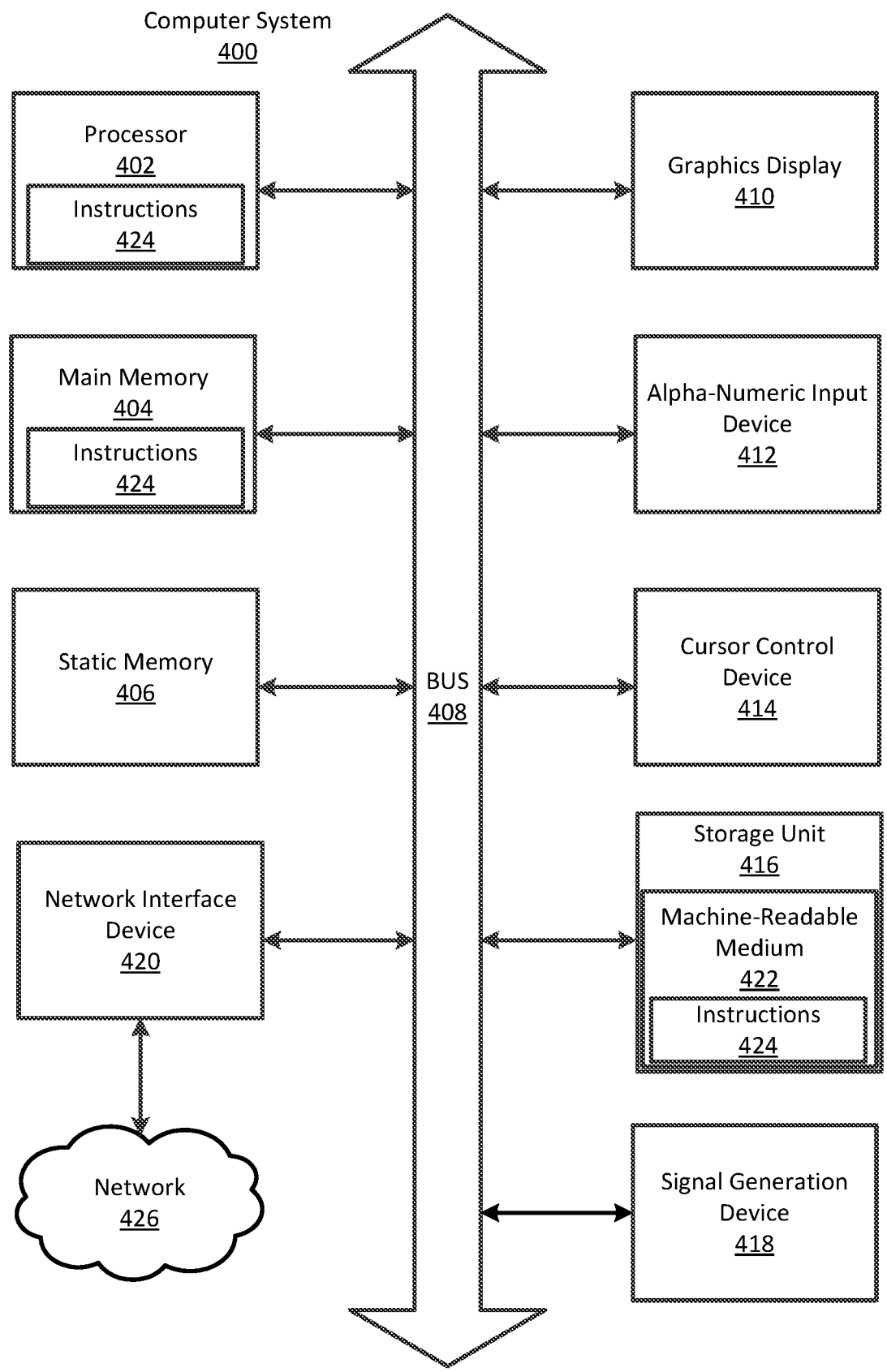
FIG. 4 is a block diagram representing a computer system suitable for use in the networked computing environment of FIG. 1, according to one embodiment.

FIG. 4 illustrates a block diagram representing a computer system, according to one example embodiment. Specifically, FIG. 4 shows a diagrammatic representation of DIE system 120 and client device 110 in the example form of a computer system 400. The computer system 400 can be used to execute instructions 424 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client system environment (e.g., environment 100), or as a peer machine in a peer-to-peer (or distributed) system environment.

The machine may be a server computer, a client computer, a personal computer (PC), a tablet PC, a set-top box (STB), a smartphone, an internet of things (IoT) appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes one or more processing units (generally processor 402). The processor 402 is, for example, a central processing unit (CPU), a graphics processing unit (GPU), a digital signal processor (DSP), a controller, a state machine, one or more application specific integrated circuits (ASICs), one or more radiofrequency integrated circuits (RFICs), or any combination of these. The computer system 400 also includes a main memory 404. The computer system may include a storage unit 416. The processor 402, memory 404, and the storage unit 416 communicate via a bus 408.

In addition, the computer system 400 can include a static memory 406, a graphics display 410 (e.g., to drive a plasma display panel (PDP), a liquid crystal display (LCD), or a projector). The computer system 400 may also include alphanumeric input device 412 (e.g., a keyboard), a cursor control device 414 (e.g., a mouse, a trackball, a joystick, a motion sensor, or other pointing instrument), a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. For example, the instructions 424 may include the functionalities of modules of the system 130 described in FIG. 1. The instructions 424 may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 may be transmitted or received over a network 426 (e.g., network 130) via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store the instructions 424. The term "machine-readable medium" shall also be taken to include any medium that is capable of storing instructions 424 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the disclosure may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the invention.

What is claimed is:

1. A computer-implemented method for conveying data forwarded by a network gateway is invalid, the method comprising:
    receiving, by the network gateway, over a network, a protocol data unit addressed to a receiving system, the protocol data unit including transport data corresponding to a transport layer of the network and application data for processing by the receiving system;
    forwarding a first portion of the protocol data unit to the receiving system using the network gateway;
    responsive to determining, after forwarding the first portion, that the application data is invalid based on one or more risk checks, modifying the transport data such that the transport data will fail a transport layer validation check;
    forwarding a second portion of the protocol data unit to the receiving system using the network gateway, the second portion including the modified transport data.

2. The method of claim 1, further comprising:
    configuring the network gateway to use a non-error-propagating data processing technique based on the application data being invalid, the non-error-propagating data processing technique including validating received data prior to forwarding received data;
    receiving, by the network gateway, a second protocol data unit addressed to a second receiving system, the second protocol data unit including second transport data corresponding to the transport layer of the network and second application data for processing by the second receiving system;
    responsive to determining, prior to forwarding any portion of the second protocol data unit, that the second protocol data unit is invalid based on one or more risk checks of the second application data, not forwarding the second protocol data unit to the receiving system.

3. The method of claim 2, wherein configuring the network gateway to use the non-error-propagating data processing technique further comprises:
    responsive to modifying the transport data, incrementing an unsuccessful validation count;
    comparing the unsuccessful validation count to an unsuccessful validation threshold; and
    responsive to determining that the unsuccessful validation count exceeds the unsuccessful validation threshold, configuring the network gateway to use the non-error-propagating data processing technique.

4. The method of claim 3, further comprising:
    receiving, by the network gateway, criteria for the receiving system, the criteria specifying a threshold number of unsuccessful validations of transport data permitted by the receiving system;
    determining, based on the criteria, the unsuccessful validation threshold.

5. The method of claim 3, further comprising:
    receiving, by the network gateway, the unsuccessful validation threshold from the sending system.

6. The method of claim 1, further comprising:
    configuring the network gateway to use an error-propagating data processing technique.

7. The method of claim 6, wherein configuring the network gateway to use the non-error-propagating data processing technique comprises:
    terminating a communication session between the network gateway and the sending system.

8. The method of claim 1, wherein the transport data includes a checksum, and modifying the transport data further comprises:
    modifying, by the network gateway, the checksum such that the transport data will fail the transport layer validation check.

9. The method of claim 1, wherein the transport data is a transmission control protocol (TCP) segment.

10. The method of claim 1, wherein the receiving system is a securities exchange and the protocol data unit describes an order directed at one or more securities offered on the securities exchange.

11. The method of claim 10, further comprising:
    responsive to determining that the transport data is invalid, cancelling a set of pending orders forwarded by the network gateway to the securities exchange.

12. The method of claim 1, wherein the method is performed by a single, integrated circuit.

13. A non-transitory computer-readable storage medium storing instructions that, when executed by a network gateway, cause the network gateway to perform operations comprising:
    receiving, by the network gateway, over a network, a protocol data unit addressed to a receiving system, the protocol data unit including transport data corresponding to a transport layer of the network and application data for processing by the receiving system;
    forwarding a first portion of the protocol data unit to the receiving system using the network gateway;
    responsive to determining, after forwarding the first portion, that the application data is invalid based on one or more risk checks, modifying the transport data such that the transport data will fail a transport layer validation check;
    forwarding a second portion of the protocol data unit to the receiving system using the network gateway, the second portion including the modified transport data.

14. The computer-readable storage medium of claim 13, wherein the operations further comprise:
configuring the network gateway to use a non-error-propagating data processing technique based on the application data being invalid, the non-error-propagating data processing technique including validating received data prior to forwarding received data;
receiving, by the network gateway, a second protocol data unit addressed to a second receiving system, the second protocol data unit including second transport data corresponding to the transport layer of the network and second application data for processing by the second receiving system;
responsive to determining, prior to forwarding any portion of the second protocol data unit, that the second protocol data unit is invalid based on one or more risk checks of the second application data, not forwarding the second protocol data unit to the receiving system.

15. The computer-readable storage medium of claim 14, wherein configuring the network gateway to use the error-propagating data processing technique further comprises:
responsive to modifying the transport data, incrementing an unsuccessful validation count;
comparing the unsuccessful validation count to an unsuccessful validation threshold; and
responsive to determining that the unsuccessful validation count exceeds the unsuccessful validation threshold, configuring the network gateway to use the non-error-propagating data processing technique.

16. The computer-readable storage medium of claim 15, wherein the operations further comprise:
receiving, by the network gateway, criteria for the receiving system, the criteria specifying a threshold number of unsuccessful validations of transport data permitted by the receiving system;
determining, based on the criteria, the unsuccessful validation threshold.

17. The computer-readable storage medium of claim 15, wherein the operations further comprise:
receiving, by the network gateway, the unsuccessful validation threshold from the sending system.

18. The computer-readable storage medium of claim 13, wherein the operations further comprise:
configuring the network gateway to use an error-propagating data processing technique.

19. The computer-readable storage medium of claim 18, wherein configuring the network gateway to use the non-error-propagating data processing technique comprises:
terminating a communication session between the network gateway and the sending system.

20. The computer-readable storage medium of claim 13, wherein the transport data includes a checksum, and modifying the transport data further comprises:
modifying, by the network gateway, the checksum such that the transport data will fail the transport layer validation check.

\* \* \* \* \*